(12) United States Patent
Hodges

(10) Patent No.: US 7,944,357 B2
(45) Date of Patent: May 17, 2011

(54) METHOD AND SYSTEM FOR A GRASS ROOTS INTELLIGENCE PROGRAM

(75) Inventor: Daniel Lloyd Hodges, Tucson, AZ (US)

(73) Assignee: Cummings Engineering Consultants, Inc., Chandler, AZ (US)

( * ) Notice: Subject to any disclaimer, the term of this patent is extended or adjusted under 35 U.S.C. 154(b) by 655 days.

(21) Appl. No.: 11/642,032

(22) Filed: Dec. 18, 2006

(65) Prior Publication Data
US 2009/0182700 A1 Jul. 16, 2009

(51) Int. Cl.
*G08B 23/00* (2006.01)
(52) U.S. Cl. ........................ 340/573.1; 706/46
(58) Field of Classification Search ............... 340/573.1; 706/21, 46, 54; 726/22, 4
See application file for complete search history.

(56) References Cited

U.S. PATENT DOCUMENTS

| | | | |
|---|---|---|---|
| 7,246,156 B2 * | 7/2007 | Ginter et al. | 709/217 |
| 2004/0249678 A1 * | 12/2004 | Henderson | 705/4 |
| 2004/0249679 A1 * | 12/2004 | Henderson et al. | 705/4 |
| 2005/0015624 A1 * | 1/2005 | Ginter et al. | 713/201 |
| 2007/0198450 A1 * | 8/2007 | Khalsa | 706/47 |

* cited by examiner

*Primary Examiner* — John A Tweel, Jr.
(74) *Attorney, Agent, or Firm* — Morgan Law Offices, PLC (57) ABSTRACT

A system for gathering and assessing intelligence information comprises a credibility filter configured to assign a credibility value to intelligence information sent from a user. A data warehouse is coupled to the credibility filter and the data warehouse is configured to store intelligence information from the user. A predictive query engine is coupled to the data warehouse. The predictive query engine is configured to query the data warehouse to determine potential threat data. The predictive query engine is also configured to store the potential threat data in the data warehouse. An alert poller is also coupled to the data warehouse. The alert poller is configured to receive the potential threat data and compare the potential threat data to one or more comparison factors preselected by the user.

17 Claims, 6 Drawing Sheets

METHOD AND SYSTEM FOR A GRASS ROOTS INTELLIGENCE PROGRAM

FIELD OF THE INVENTION

This invention relates generally to the field of information and data gathering and, more specifically, to a method and system for a grass roots intelligence program.

BACKGROUND OF THE INVENTION

In a world where the major threat to the safety and security of a nation no longer comes from the threat of nuclear warfare among super powers, but from the threat of localized terrorist activity, former methods and systems for intelligence gathering have become insufficient. Often the individuals in the best position to report potential terrorist activity are individual civilians, who might spot suspicious activity during their daily routine or may be in the best position to determine what is suspicious activity for a given location and situation.

However, current communication infrastructures for reporting terrorist activity or other potentially harmful activities are limited. In most locations, an individual citizen that wants to report potential terrorism or criminal behavior must call 911 and talk to a police 911 dispatcher. The police 911 dispatcher receiving such a call typically performs no screening on the call to determine the credibility of the caller. Additionally, 911 systems can not query databases of previously gathered intelligence to assist in evaluating the threat reported by the caller.

To evaluate threats in a military theater, Time Critical Targeting (TCT) can be used. The basic elements of TCT include finding a target, fixing the target at a location, tracking the target, targeting the target and then engaging the target. In a military theater of operation, these steps can be performed by military personnel. What is needed is a system and method for a grass roots intelligence program to allow civilians to be responsible for at least some of these steps and to allow law enforcement personnel, such as local police, the FBI, Homeland Security or the like, to perform other steps (such as targeting the target and engaging the target).

BRIEF SUMMARY OF THE INVENTION

In one embodiment of the present invention, a method for collecting and evaluating information comprises a first step of receiving information from a user. Next, the information is evaluated to determine a credibility value. The information and the associated credibility value are stored in a database. The database is then queried to generate potential threat information. The generated potential threat data is then stored to the database. The potential threat data is searched against criteria determined by the user. An alert is generated for the user if at least one of the potential threats matches one of the criteria of the user.

In another embodiment, a system for gathering and accessing intelligence data comprises a credibility filter configured to assign a credibility value to intelligence data sent from a user. A data warehouse is coupled to the credibility filter and the data warehouse is configured to store intelligence data from a plurality of users. A predictive query engine is coupled to the data warehouse. The predictive query engine is configured to query the data warehouse to determine potential threat data. The predictive query engine is also configured to store the potential threat data in the data warehouse. An alert poller is also coupled to the data warehouse. The alert poller is configured to receive the potential threat data and compare the potential threat data to one or more comparison factors pre-selected by the user.

In yet another embodiment, a mobile communication device for communicating intelligence data comprises a display configured to display an intelligence gathering program icon. The mobile communication device further comprises a processor coupled to the display. The processor is configured to, upon selection of the intelligence gathering program icon, execute an intelligence gathering program. The intelligence gathering program is configured to allow the user to send intelligence data to an evaluation system.

BRIEF DESCRIPTION OF THE DRAWINGS

The present invention will hereinafter be described in conjunction with the following drawing figures, wherein like numerals denote like elements, and.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
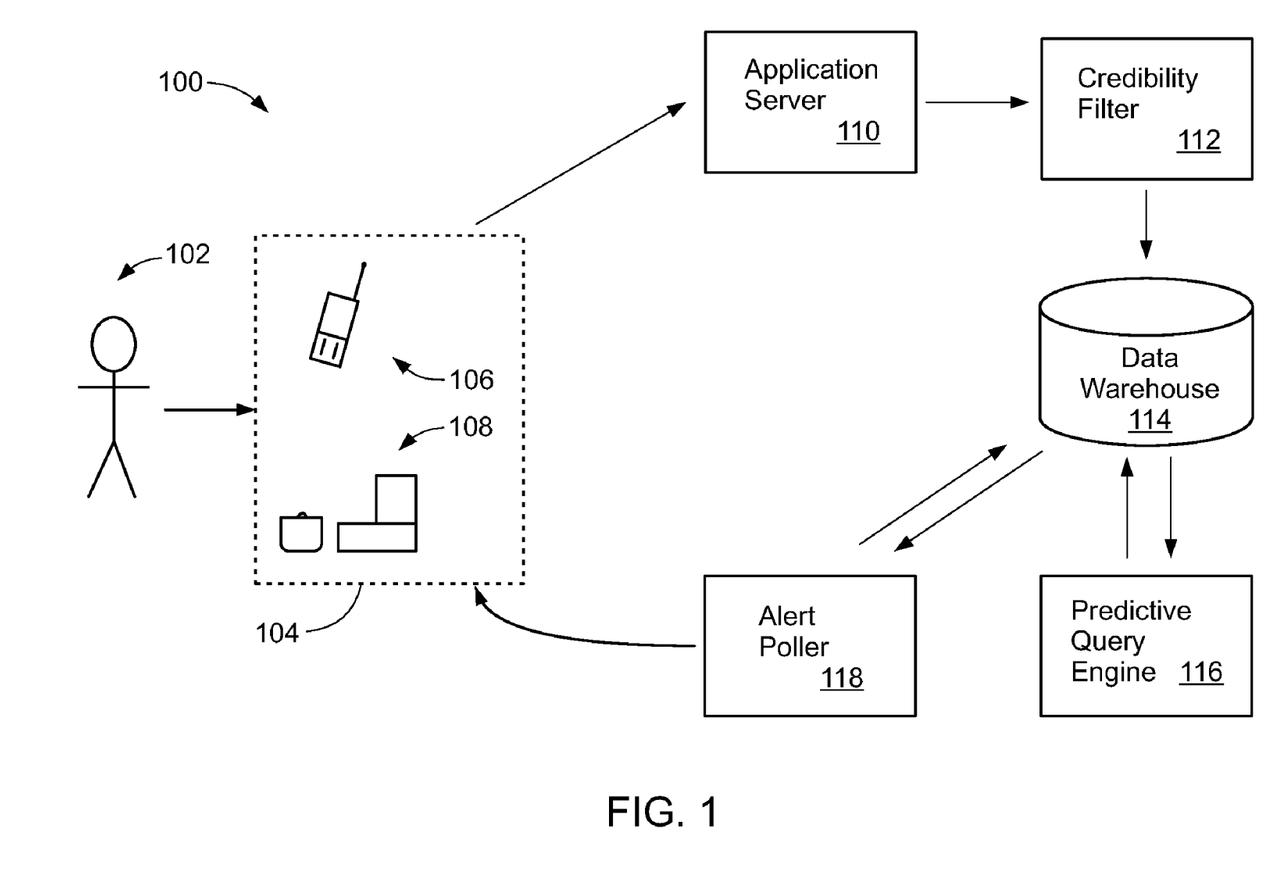
FIG. 1 is a block diagram of an exemplary embodiment of an intelligence gathering system in accordance with the teachings of the present invention.

FIG. 1 is a block diagram of an exemplary embodiment of a grass roots intelligence system 100. Grass roots intelligence system 100 comprises a user 102, which can utilize a communication device 104 such as, a mobile device 106 or a non-mobile device 108 to access application server 110. Application server 110 is coupled to a credibility filter 112. Credibility filter 112 is coupled to a data warehouse 114. Data warehouse 114 is, in turn, coupled to a predictive query engine 116 and an alert poller 118.

User 102 can be any individual capable of using one or more communication devices 104. In one exemplary embodiment, user 102 can be any individual that desires to provide information regarding possible terrorist or criminal activity, hence the grass-roots nature of the system. User 102, in another embodiment, can pre-register with the provider of the system 100 to provide information or information can be provided anonymously. Allowing concerned individuals an easy way to provide information on possible terrorist or criminal activity dramatically increases the amount of individuals looking for suspicious activity.

In one exemplary embodiment, user 102 can register to provide information by accessing a website and completing on-line forms or by following other sign-up procedures. The user 102 can then be provided with a user name and password to allow for future secured and authenticated access to the system. Additionally, the user 102 can submit information regarding what types of personal alerts or warnings are desired. The personal alerts or warnings can be provided to the user when the information the user provided correlates with the potential terrorist or criminal threats to the user. One benefit of registration is that information provided by registered users, in one exemplary embodiment, can receive higher credibility values, as described below.

Communication device 104 can be any device capable of receiving information from a user 102 and sending that information to the application server 110 or another part of the system 100. Communication device 104, in one embodiment, can be either a mobile device 106 or a non-mobile device 108. Data can be sent from the communication device 104 in many different ways, such as using email, via accessing a website dedicated to receiving information from the communication devices 104, via a dedicated program running on the communication device 104 and designed to collect information regarding terrorist or criminal activity from the user 102 and the like. Once data inputs are made to the communication devices 104, such data regarding terrorist or criminal threats, the data can be sent to the rest of the system 100.

Depending on what type of communication device 104 the data is sent from, information about the sending device can also be sent. For example, e-mail can include the IP address of the computer as well as other computer information. If the information is sent through a mobile phone, the mobile number, the mobile equipment identification number (IMEI) and the location phone based on a triangulation calculation or GPS data from the phone. In one embodiment, the more information that is known about the mobile device and, therefore, known about the user, more credibility can be assigned to the data and information provided.

Non-mobile device 108 can be any non-mobile computer device capable of communicating with the system 100. For example, non-mobile device 108 can be a personal computer or a public computer such as computer kiosks distributed in public to allow for the reporting of suspicious criminal or suspected terrorist activities. As with mobile device 106, non-mobile device 108 can send information from the user 102 via email, through a dedicated website or via a program running on the non-mobile device 108.

Mobile device 106 can be any device that can be easily moved by, or carried with user 102, and that can communicate with the rest of the system 100. For example, mobile device 106 can be a mobile phone or a personal digital assistant (PDA) capable of wireless communication such as those running the palm or windows mobile operating system. The user 102 of the mobile device 106 can submit information reporting a terrorist or criminal threat via an email message sent from the mobile device 106, a web browser accessing a website designed to receive threat information, through the use of short messaging service (SMS) or multimedia messaging services (MMS), through the use of a dedicated program running on the mobile device 106 and the like.

Figure 2A:
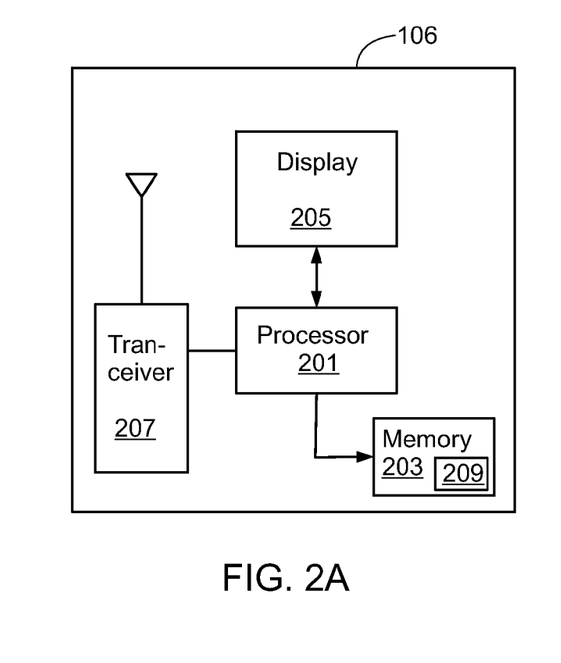
FIG. 2a is a simplified block diagram of an exemplary embodiment of a mobile device for use in an intelligence gathering system in accordance with the teachings of the present invention.

FIG. 2a is a simplified block diagram of an exemplary mobile device 106 in accordance with the teachings of the present invention. Mobile device 106 can include a processor 201 coupled to memory 203, a display 205 and a transceiver 207. Processor 201 can be any processor designed to work with a mobile device such as those made by INTEL Corp, of San Jose, Calif. or TEXAS INSTRUMENTS, of Dallas, Tex. Processor 201 can execute or run programs stored in memory 203.

Display 205 provides a visual user interface to display information to the user 106. In some embodiments, display 205 maybe a touch sensitive display that can also act as an input device. Display 205 can display icons representative of programs that can be executed through selection of the appropriate icon. Once a program is running, further manipulation of the program can be done via a touch-sensitive screen, a physical keyboard or other input device. In the present invention, an intelligence reporting program 209 can be stored in the memory 203 and selected to run on the mobile device 106. The intelligence reporting program 209, as explained below, provides a mechanism for allowing the reporting of potential terrorist or criminal threats.

Transceiver 207 receives and transmits data wirelessly. Transceiver 207 can be a mobile phone transceiver such as a CDMA transceiver, a GSM transceiver or other mobile phone protocol specific transceiver. Transceiver 207 can also be a long or short range wireless or WiFi transceiver such as those that are 802.11 compliant. In one embodiment, mobile device 106 can include different types of transceivers.

Figure 2B:
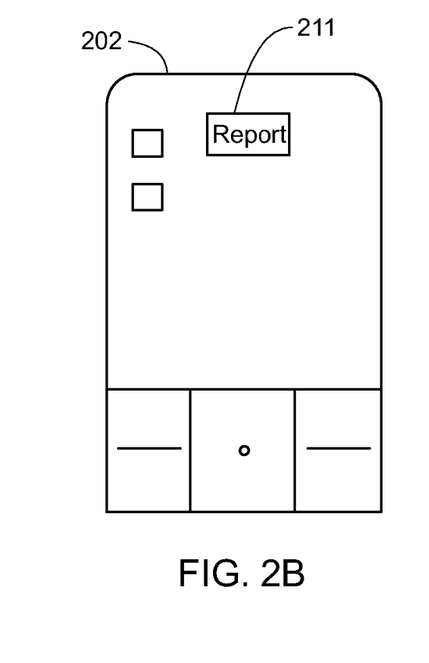
FIG. 2b is a block diagram of an exemplary mobile device using the intelligence reporting program for reporting terrorist activity in accordance with the teachings of the present invention.
Figure 2C:
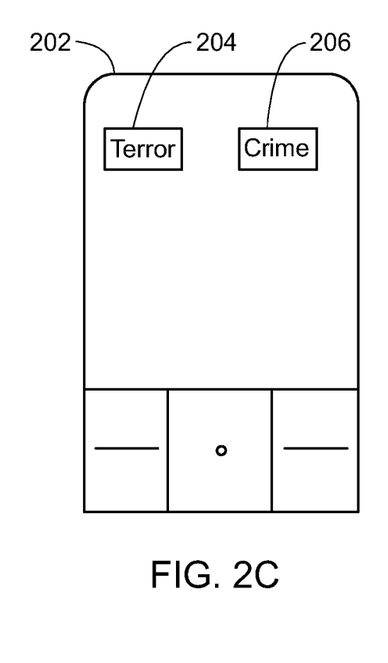
FIG. 2c is a block diagram of an exemplary mobile device using the intelligence reporting program for reporting criminal activity in accordance with the teachings of the present invention.

FIG. 2b illustrates an exemplary mobile device 202 that includes an intelligence reporting program start icon 211, which when selected will start the intelligence reporting program 209 to allow user 102 to send information regarding terrorist or criminal activity. Selection of the intelligence reporting program start icon 211 can bring up two other icons, a terrorism icon labeled (alphanumerically and/or graphically labeled) terrorism 204 and a crime icon labeled (alphanumerically and/or graphically labeled) crime 206 as seen in FIG. 2c. The user can then select the appropriate icon depending on whether the threat is due to terrorist activity or criminal activity. Additional icons can also be provided for features such as secured discreet communications between users or selected groups of users such as between users who are first responders.

Figure 3:
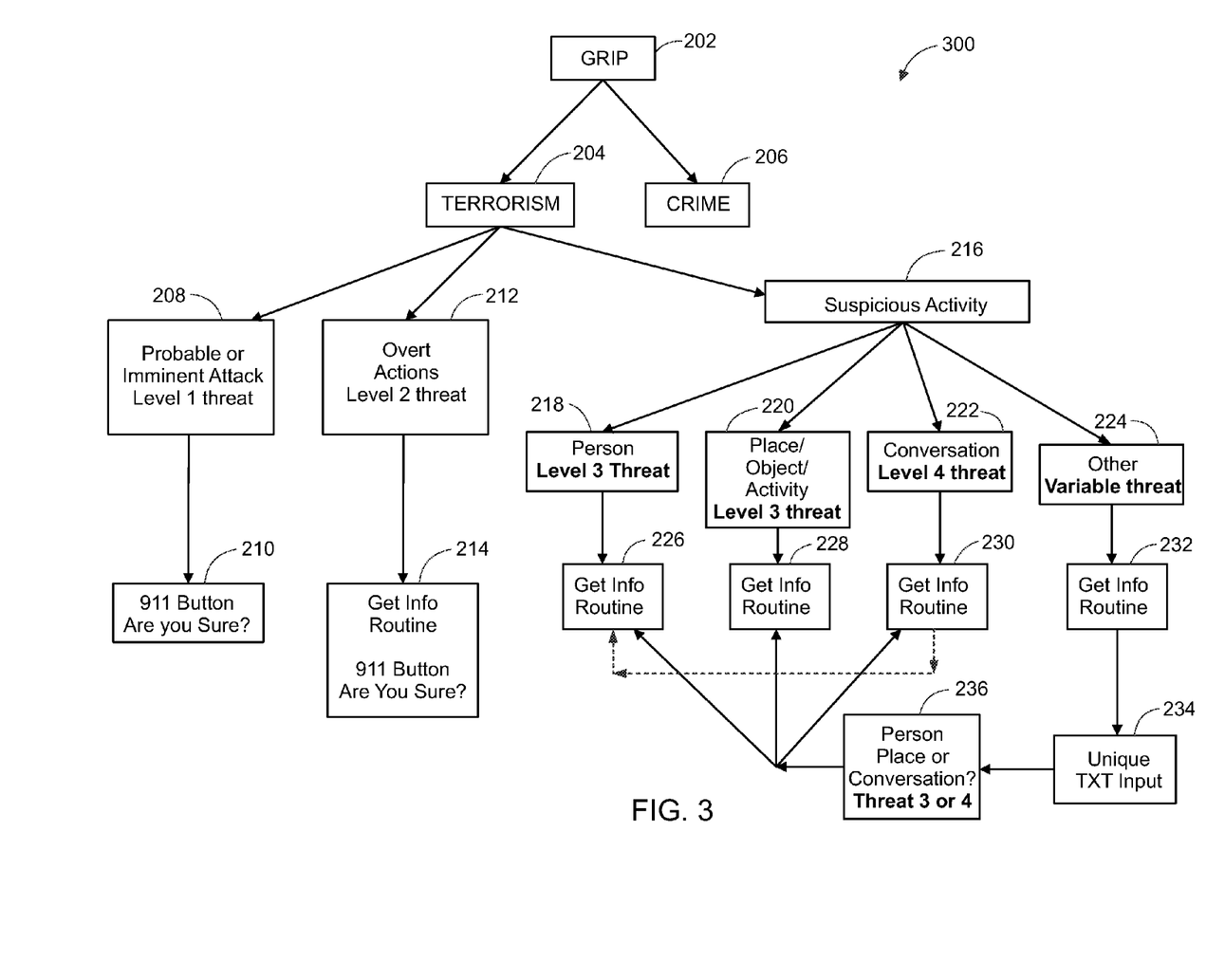
FIG. 3 is a flowchart illustrating an exemplary communication flow for reporting terrorist activity in accordance with the teachings of the present invention.

FIG. 3 is a flowchart illustrating an exemplary intelligence gathering flow 300 for users selecting to report terrorist activity. In this case, a user would have first selected the intelligence reporting start icon 211 and then the terrorism icon 204 (as shown in FIGS. 2(*a*) and 2*c*). As depicted in FIG. 3, once the terrorism icon 204 is chosen, the user 102 can select an immediate threat input 208, an over action input 212 or a suspicious activity input 216. The probable or imminent threat input 208 can be selected when the user 102 needs to report terrorist activity that is currently occurring or could result in a terrorist attack within a short time. In terms of threat level, probable or imminent attack can be considered the highest threat level, or threat level 1. Once the user 102 selects the probable or imminent threat input 208, a 911 button 210 is generated and displayed which allows the user 102 to confirm he/she is reporting a probable or imminent act. Selection of the 911 button 210 can then send the terrorism information to the system 100 for credibility assessment, predictive querying and alert polling as more fully described below. Also, in one exemplary embodiment, selection of the 911 button 210 contacts appropriate local, state or national law enforcement or emergency personnel.

For terrorist activity that does not rise to the level of a probable or imminent act but that may, nonetheless, consist of overt terrorist actions, such as overhearing terrorists planning activity, the overt action input 212 can be selected. The selection of overt action input 212 initiates an information gathering routine 214, which can then prompt the user 102 for all necessary information regarding the potential threat. Overt actions can be classified as level 2 threats. After the information regarding the overt action is collected, the 911 button 210 is displayed to confirm that information regarding an overt action is being sent.

If user 102 is reporting suspicious activity, a suspicious activity input 216 can be selected. Selecting the suspicious activity input 216 produces options that allow user 102 to select whether the threat is to a person, by selecting a person input 218; a place, object or activity, by selecting the place, object or activity input 220; regarding a suspicious conversation, by selecting conversation input 222 or if the suspicious activity is some other category by selecting other input 224. Activities regarding persons and places and objects can be classified as level 3 threats while mere conversations can be classified as level 4 threats. Once any of these inputs 218-224 are selected, an associated information gathering routine 226-232 is run to gather information regarding the suspicious activity. In one embodiment, the information gathering routine 226-232 is a menu or forms driving routine designed to gather information that can be easily indexed and processed by the system 100.

If the other input 224 was selected, following the gathering of the information, the text inputted or data otherwise provided can be scanned, parsed, screened or otherwise analyzed by an input module 234 and then categorized by a categorizer 236 into an activity regarding a person; a place, object or activity; or a conversation.

Figure 4:
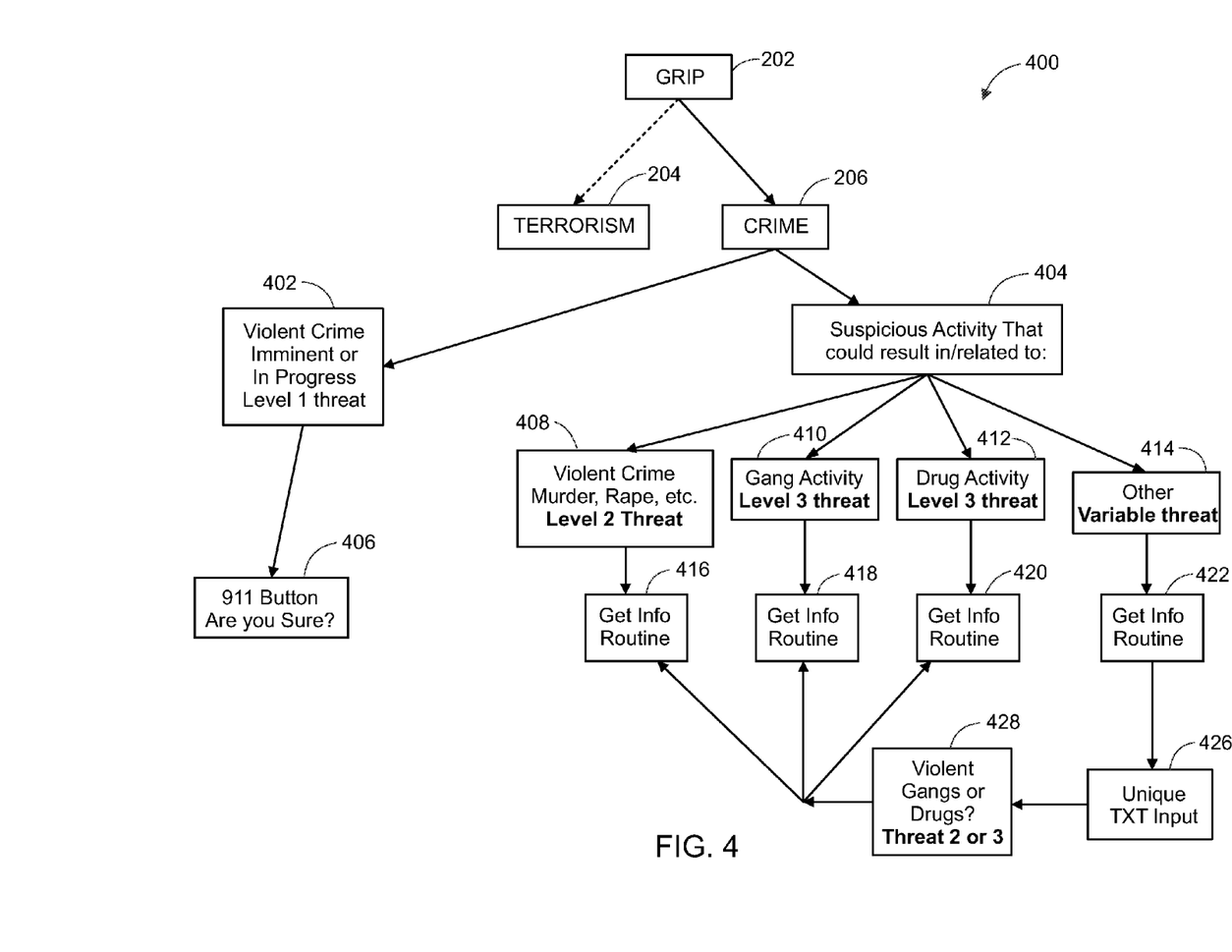
FIG. 4 is a flowchart illustrating an exemplary communication flow for reporting criminal activity in accordance with the teachings of the present invention.

Turning to FIG. 4, which illustrates an exemplary criminal activity reporting flowchart, if the user 102, upon selection of the intelligence reporting start icon 211 selects the crime icon 206, the user 102 can then select if the criminal activity to be reported is a violent crime that is imminent or occurring by selecting imminent violent crime input 402 or if the criminal activity to be reported is suspicious activity by selecting suspicious activity input 404.

The imminent crime input 402 can be selected when the user 102 needs to report criminal activity that is currently occurring or will occur shortly. Typically, the imminent crime input 402 is used to report imminent violent crimes, however, the overall reporting system can be designed to accept any imminent criminal behavior. In terms of threat level, imminent or in progress violent crimes can be considered the highest threat level, or threat level 1, Once the user 102 selects the imminent violent crime input 402, a 911 button 406 is generated which allows the user 102 to confirm he/she is reporting a probable or imminent criminal act, Selection of the 911 button 406 sends criminal information to the system 100 for credibility assessment, predictive querying and alert polling as described below. Also, in one exemplary embodiment, selection of the 911 button 406 contacts appropriate local, state or national law enforcement or emergency personnel.

For criminal activity that does not rise to the level of an imminent or in progress criminal threat, the suspicious activity input 404 can be selected. Selecting the suspicious activity input 404 produces options that allow user 102 to select whether the threat is regarding violent crime such as murder or rape, by selecting a violent crime input 408; gang activity, by selecting the gang activity input 410; regarding drug activity, by selecting drug activity input 412 or if the suspicious activity is some other category by selecting other input 414. Murder and rape, in one embodiment, can be considered a level 1 threat and gang activities and drug activities can be considered a level 2 threat. Once any of these inputs 408-414 are selected, an associated information gathering routine 416-422 is run to gather information regarding the suspicious activity. In one embodiment, the information gathering routines 416-422 is a menu or forms driving routine designed to gather information that can be easily indexed and processed by the system 100

If the other input 414 was selected, following the gathering of the information, the text or data inputted is scanned, parsed, screened, or otherwise analyzed by an input module 426 and can then categorized by a categorizer 428 into the violent crime, gang activity or drug activity category, if possible.

While FIGS. 3 and 4 showed an exemplary method of gathering intelligence information for terrorist and criminal threats, alternative was of using dedicated programs to gather the information, including the use of filling forms, graphical images to select choices, open ended answers and the like can be used and varied by one of skill in the art. The use of a program on the mobile device provides a standardized way to gather the information that is readily accessible by a user. The information gathering program 209 can also include the ability to attached video or pictures to information.

Returning to FIG. 1, application server 110 can be one or more computers capable of receiving information from communication devices 104, either directly or indirectly. Application server 110, in one exemplary embodiment, is one or more secure computers running the UNIX or LINUX operating system. Application server 110 can execute applications such as mail server applications, web server applications and application programs supporting communications with mobile phones, PDAs and the like. Application server 110 can also execute programs that support administrative functions such as securely registering users and managing user accounts.

Credibility filter 112 can be any application, running on a computer, such as the application server 110 or another computer, capable of determining a credibility value based on data received from the user and other factors. Some factors that can be used to assign the credibility value can include the intelligence source, the location of the threat, current events, and the type of threat. The intelligence source factor can take into account whether the user is a registered user or an anonymous user. The location factor can take into account such factors as where the potential threat may occur, such as at a large gathering, an important asset like a power plant or other factors. The current event factor can take into account factors such as the current alert status in a country or locations or current threat assessments on a local, national or global level. The type of threat factor can take into account whether the threat is one that will cause great damage or is at some other level of harm. In one embodiment, the threat level is based on different types of threats, such as the threat levels of FIG. 4. These factors are, of course, exemplary factors. Additional factors or fewer factors could also be used to determine credibility.

Data warehouse 114 can be any data storage device capable of storing information received from users 102 as well as any other intelligence data such as one or more hard drives, optical drives, solid state memory and the like. In one embodiment, data warehouse 114 is a secure database. Data stored can include both textual information and image data, which can be used to support identified threats. Data warehouse 114 can also be used to store account information such as registered user names and passwords. Also, user preferences, such as alerts to receive, can be stored. The alerts are discussed in further details below. Data warehouse 114 can also be used to store the results of the predictive query engine 116 as discussed in further detail below.

Predictive query engine 116 can be any program or device that can filter information from data warehouse 114 and predict and assess relative threat factors. In one exemplary embodiment, linear or polygonal pattern matching can be used to determine threat levels. For example, if a large number of similar threats are reported in a similar area, each report having a high credibility rating, the predictive query engine 116 can determine that the current threat of terrorist activity is high. In another embodiment, expert systems and non-linear pattern matching techniques, such as neural networks or genetic algorithms can be used to improve predictions and assessments. Factors such as security of threat, threat location, credibility of the threat and the like can be used with the procedure query engine 116. The results of the predictive query engine 116 can be stored in the data warehouse 114.

Alert poller 118 can be any program or device capable of receiving or polling the results of the predictive query engine and alerting one or more users 102 upon identification of a threat. In one embodiment, alert poller 118 notifies one or more governmental agencies when a terrorist threat or criminal threat is detected, is imminent, or when activity matches predefined patterns of activity, and the like. In another embodiment, any registered user 102 can receive a warning and/or threat data regarding the threat. Threat data can be sent to a user 102 based on the location of the user and/or previously entered preferences. The specificity of the data can be based on the user's 102 security level.

Figure 5:
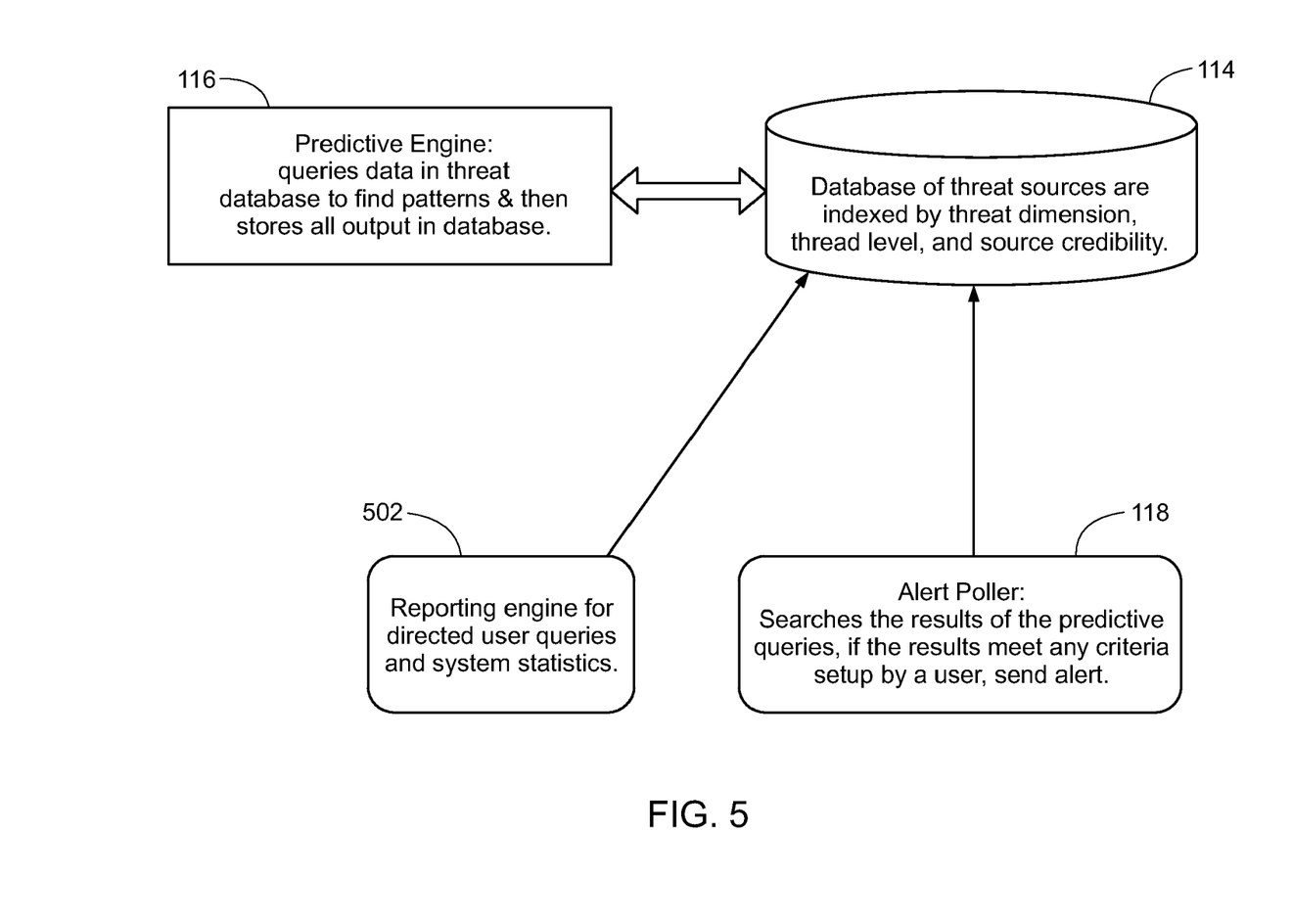
FIG. 5 is a flowchart illustrating an exemplary embodiment of a grass roots intelligence program in accordance with the teachings of the present invention.

FIG. 5 is a block diagram of an exemplary threat reporting system in accordance with the teachings of the present invention. As discussed previously, predictive query engine 116 is coupled to the data warehouse 114 which is coupled to the alert poller 118. A reporting engine 502 is coupled to the data warehouse 114.

The predictive query engine 116, as discussed previously, queries the data stored in the data warehouse 114 to find patterns and stores the results in the data warehouse 114, which identifies threat sources using criteria such as threat level and source credibility. As before, the alert poller 118 searches the stored results of the predictive query engine 116 and sends alerts based on matches to pre-determined criteria supplied by the individual user 102.

Reporting engine 502 generates reports based on user 102 inquiries into data stored in data warehouse 114. For example, reports can be generated that can map the locations of criminal or terrorist threats, list users reporting threats and the like. Reporting engine 502 can also generate system statistics. For example, the reporting engine 502 can be used to query data stored in data warehouse 114 to see how many threats have been made to a specific target or person. In one embodiment, the use of reporting engine 502 can be limited to certain users such as law enforcement personnel, first responders and the like.

Figure 6:
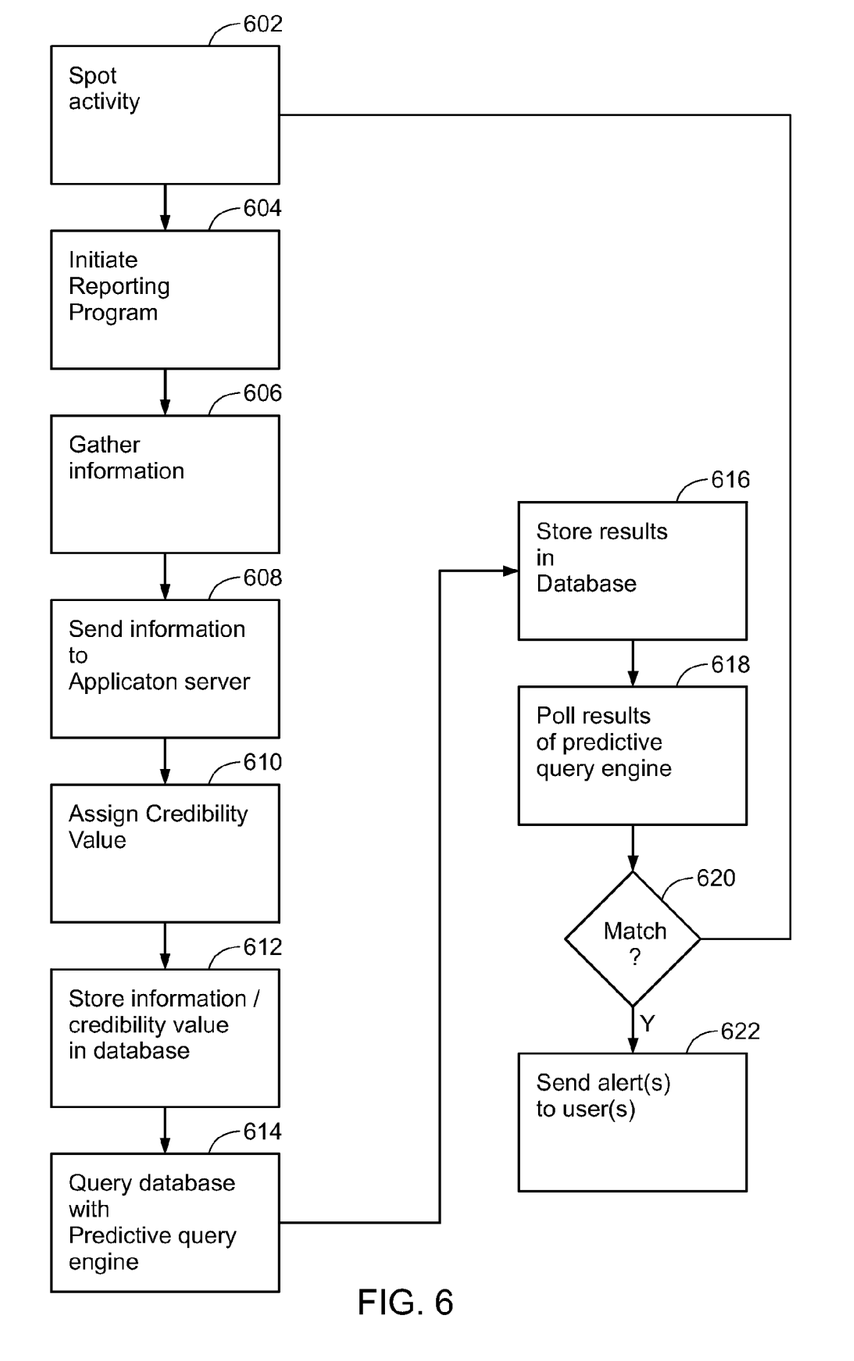
FIG. 6 is a flowchart of an exemplary embodiment of a threat reporting system in accordance with the teachings of the present invention.

FIG. 6 is a flowchart illustrating an exemplary method of operating the grass roots intelligence system 100. In operation, a user 102, with a mobile device 106 (of course, a user 102 could be using a non-mobile device 108), spots suspicious activity in an initial step, step 602. Next, in step 604, in one embodiment, the user 102 initiates the intelligence reporting program 209 on the mobile device 106. Of course, instead of sending data or information regarding suspicious activity via the intelligence reporting program 209, the user 102 could send an email or connect to a web page using a fixed computer or a mobile device 106. If the intelligence gathering program 209 is initiated, then information can be collected as outlined in step 606 as shown in FIGS. 3 and 4. If an email is sent, or if a website is used to send information, then information is sent based on those means.

In step 608, the information is sent to the application server 110 for utilization by the correct application existing on the application server 110 that is designed to reference the information sent by the user 102. For example, an email or web application can handle mail or web sent information whereas information from the dedicated PDA program can be gathered by a PDA input program. Application server 110 can also provide other functions such as decryption functions to decrypt data sent by the user 102.

In step 610, credibility filter 112 is used to assign a credibility value to the information. sent by the user. As discussed previously, the credibility filter 112 can filter spam or otherwise frivolous submissions and determine credibility values based on factors such as whether the user 102 is registered, if the user 102 can be uniquely identified, the source address (whether the submission is from. a mobile phone, fixed computer accessing the web and the like. Additionally, credibility values can be determined using expert systems as well as predictive systems using neural networking or similar algorithms. The information, credibility value and any supporting data is then stored in the data warehouse 114 in step 612.

In step 614, the predictive query engine 116 queries the data warehouse 114 to determine and assess threats from terrorist or criminal activity. As discussed previously, linear mapping or expert systems can be used to predict and assess threats. Additionally, more advanced predictive techniques such as neural networks or genetic algorithms can be used alone or in conjunction with expert systems or linear mapping. Additionally, the predictive query engine 116 can also search beyond the data warehouse 114 to obtain more information about a given threat such as searching the Internet or Internet news feeds (RSS). The output of the predictive query engine 116 is then stored in the data warehouse 114 in step 616.

In step 618, alert poller 118 polls the results of the predictive query engine 116 to look for identified threats. As discussed previously, pre-determined criteria set by user 102 is compared to various threat factors such as threat type, threat level, source credibility and the like in step 620. If a match results, an alert is sent to the user 102 in step 622. The overall specificity of the data sent by the user 102 can be adjusted based on the security level of the user 102. If no match results, the information collection, credibility evaluation, predictive determination and alert polling steps of FIG. 6 continue.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method for collecting and evaluating information comprising:

receiving information from a user;

evaluating the information to determine a credibility value;
storing the information and the associated credibility value in a database;
querying the database to generate potential threats;
saving the generated potential threats to the database;
searching the potential threats against pre-determined criteria provided by the user; and
generating an alert for the user if at least one of the potential threats matches one of the pre-determined criteria of the user.

2. The method of claim 1 wherein the information comprises information regarding terrorist activity.

3. The method of claim 1 wherein the information comprises information regarding criminal activity.

4. The method of claim 1 wherein the step of receiving information from a user further comprises receiving information from a mobile device operated by the user.

5. The method of claim 4 wherein the step of receiving information from a user further comprises receiving information from a terrorist/criminal information reporting program running on the mobile device operated by the user.

6. The method of claim 1 wherein the step of receiving information further comprises receiving information from a pre-registered user.

7. The method of claim 6 wherein the step of evaluating the information to determine a credibility value further comprises assigning a higher credibility value to the pre-registered user.

8. The method of claim 1 wherein the step of querying the database further comprises using linear pattern matching to generate potential threats.

9. The method of claim 1 wherein the step of querying the database further comprises using neural network techniques to generate potential threats.

10. A system for gathering and assessing intelligence data comprising:
a credibility filter configured to assign a credibility value to intelligence data from a user;
a data warehouse coupled to the credibility filter, the data warehouse configured to store intelligence data from the user;
a predictive query engine coupled to the data warehouse, the predictive query engine configured to query the data warehouse to determine potential threat data, the predictive query engine also configured to store the potential threat data in the data warehouse; and
an alert poller coupled to the data warehouse, the alert poller configured to receive the potential threat data and compare the potential threat data to one or more comparison factors pre-selected by the user.

11. The system of claim 10 wherein the intelligence data is sent by the user from a non-mobile device.

12. The system of claim 10 wherein the intelligence data is sent from a mobile device.

13. The system of claim 12 wherein the intelligence data is sent using a dedicated intelligence reporting program.

14. The system of claim 10 wherein the predictive query engine utilizes linear pattern matching techniques to determine potential threat data.

15. The system of claim 10 wherein the predictive query engine utilizes neural network techniques to determine potential threat data.

16. The system of claim 10 wherein the alert poller notifies the user of a match between the pre-determined threat data and the comparison factors.

17. The system of claim 10 wherein the credibility filter assigns the credibility value a variety of credibility factors.

* * * * *